United States Patent [19]

Gargano

[11] 4,399,969
[45] Aug. 23, 1983

[54] GLIDING PARACHUTE

[75] Inventor: William L. B. Gargano, Santa Ana, Calif.

[73] Assignee: Edward Strong, Orlando, Fla.

[21] Appl. No.: 221,895

[22] Filed: Dec. 31, 1980

[51] Int. Cl.$^3$ .................... B64D 17/02; B64D 17/68
[52] U.S. Cl. .................................... 244/145; 244/149; 244/DIG. 1
[58] Field of Search ................ 244/16, 142, 145, 147, 244/149, 152, DIG. 1

[56] References Cited

U.S. PATENT DOCUMENTS

| Re. 26,427 | 7/1968 | Jalbert | 244/142 |
|---|---|---|---|
| 1,562,258 | 11/1925 | Russell . | |
| 1,872,705 | 8/1932 | Elliot . | |
| 2,214,569 | 9/1940 | Willing et al. | 244/142 |
| 2,282,407 | 5/1942 | Hoffman et al. | 244/145 |
| 2,358,582 | 9/1944 | Little | 244/145 |
| 2,365,184 | 12/1944 | Frieder et al. | 244/145 |
| 2,511,263 | 6/1950 | Hiscock | 244/145 |
| 2,520,931 | 9/1950 | Heinrich | 244/152 |
| 2,527,553 | 10/1950 | Ingels | 244/145 |
| 2,577,047 | 12/1951 | Taylor | 244/145 |
| 2,610,008 | 9/1952 | Smith | 244/152 |
| 2,693,924 | 11/1954 | Frieder et al. | 244/145 |
| 2,696,959 | 12/1954 | Aileo | 244/142 |
| 2,721,716 | 10/1955 | Beadle | 244/142 |
| 2,730,315 | 1/1956 | Fogal et al. | 244/145 |
| 3,173,636 | 3/1965 | Sepp | 244/145 |
| 3,199,814 | 8/1965 | Frieder | 244/145 |
| 3,228,635 | 1/1966 | Hughes et al. | 244/145 |
| 3,285,546 | 11/1966 | Jalbert | 244/145 |
| 3,428,277 | 2/1969 | Everett | 244/142 |
| 3,498,565 | 3/1970 | Nash-Boulden | 244/152 |
| 3,524,613 | 8/1970 | Reuter et al. | 244/142 |
| 3,540,684 | 11/1970 | Snyder | 244/149 |
| 3,700,191 | 10/1972 | Page | 244/16 |
| 3,724,789 | 4/1973 | Snyder | 244/145 |
| 3,945,592 | 3/1976 | Sutton | 244/152 |
| 4,039,164 | 8/1977 | Booth | 244/149 |
| 4,175,722 | 11/1979 | Higgins | 244/DIG. 1.2 |

FOREIGN PATENT DOCUMENTS

| 206084 | 3/1955 | Australia | 244/145 |
|---|---|---|---|
| 824349 | 4/1938 | France . | |
| 1102665 | 2/1968 | United Kingdom . | |

OTHER PUBLICATIONS

"Jump with Me! The Parachute that Glides Like a Plane", by Douglas Garr, *Popular Science*, pp. 76–77, 112.
*Mechanix Illustrated*, Sep. 1978, pp. 36–37.
"Paracraft-The Powered Parafoil", by Luther Hux, *Model Aviation*, Sep. 1980, cover and pp. 62–65 & 122.
Gerald Nathe, "Analysis of the Para-Foil", *AIAA Student Journal*, vol. 5, No. 1, Feb. 1967.

*Primary Examiner*—Charles E. Frankfort
*Attorney, Agent, or Firm*—Brown & Martin

[57] ABSTRACT

A gliding parachute of the flexible, multi-cell airfoil type having a length to width ratio in the range of approximately 2:1 to 2.85:1, a maximum camber height to chord ratio in the range of approximately 0.1:1 to 0.2:1, a wing span to load attachment distance ratio of approximately 2:1, and an attachment point approximately 25% to 45% of the chord aft of the leading edge. The suspension lines and the fabric sections of the wing are dimensioned to impart a side to side curvature to the inflated wing. The gliding parachute has superior maneuverability and lift. A special pilot chute and bridle assembly are provided so that upon deployment of the main chute the pilot chute will automatically collapse to substantially reduce its drag, thereby improving the glide ratio of the main parachute.

4 Claims, 14 Drawing Figures

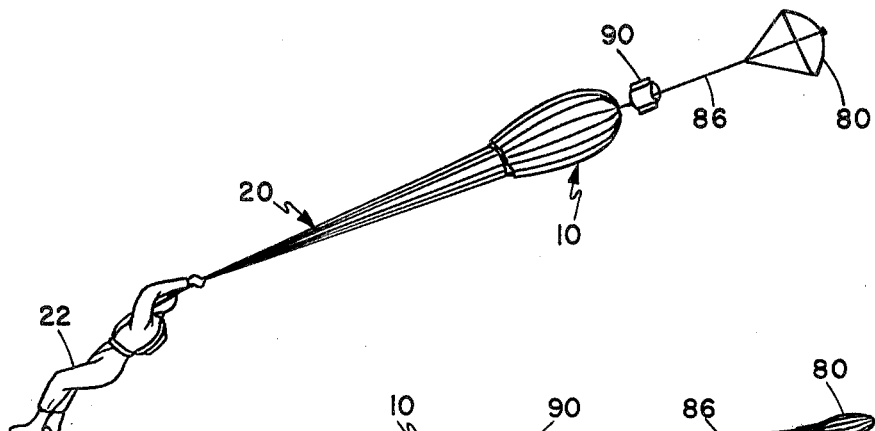
Fig. 11
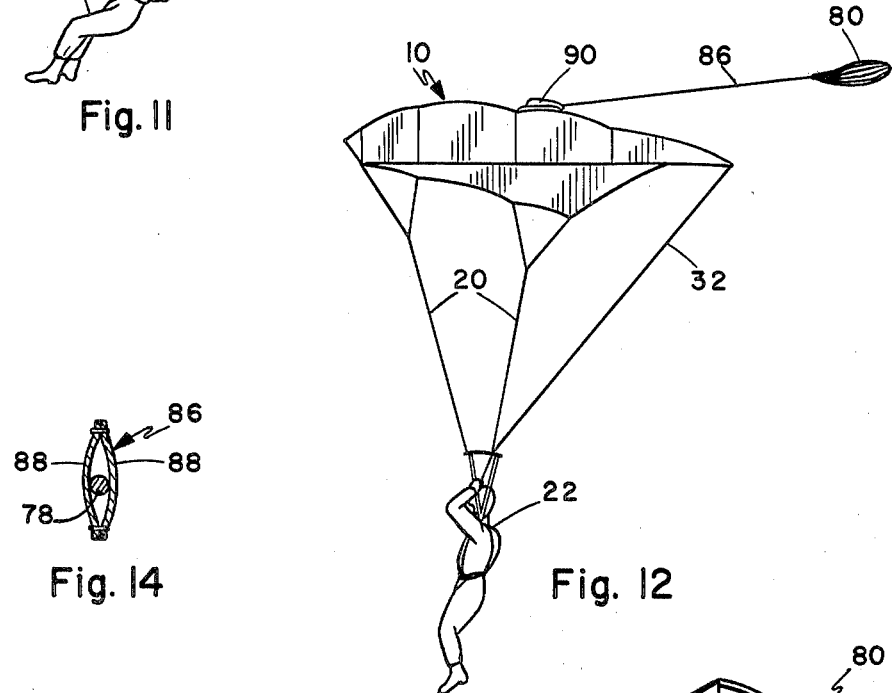
Fig. 14
Fig. 12
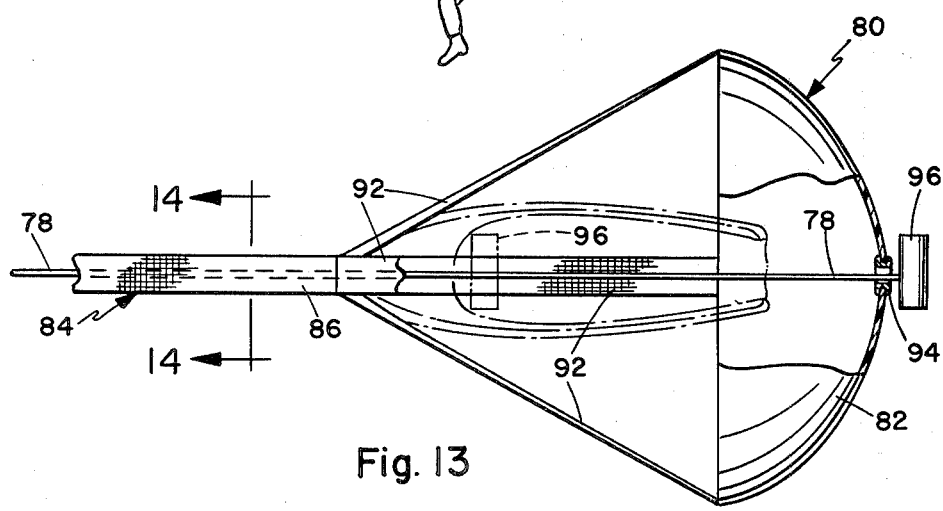
Fig. 13

GLIDING PARACHUTE

BACKGROUND OF THE INVENTION

The present invention relates to parachutes, and more particularly, to a gliding parachute of the flexible airfoil type having an improved construction that results in superior maneuverability and glide ratio.

For many years parachutes have been constructed by sewing a plurality of panels together to define a hemispherical structure when inflated. Some of these domelike parachutes have incorporated slits, vents or baffles for controlling the flow of air therethrough, both to facilitate deployment and to provide maneuverability. However, these parachutes are adapted primarily for nearly vertical descent, and generally do not permit a load to be guided over substantial horizontal distances to a target landing area.

Recently, gliding parachutes have been developed for sport jumping, fire fighting, and military applications which can be readily manipulated to carry a load over a substantial distance. A typical gliding parachute is preformed and constrained in such a manner that when inflated it will define an airfoil in longitudinal section. When a load is suspended from this type of inflated parachute, the parachute will glide forwardly and its airfoil shape will provide the necessary lift. By controlling the peripheral edges of the gliding parachute, the parachute and the load can be guided in their path of descent to a target many miles away from the drop point.

Much emphasis has been placed on the fabric and rigging configurations of previous gliding parachutes in an effort to approximate, as close as possible, a conventional airfoil shape. It has been assumed that this would result in maximum lift for a given chute area which would in turn provide the maximum glide ratio. The maximum glide ratio (lift/drag) of prior gliding parachutes has been about three to one. This means that for every foot of vertical descent, the parachute travels three feet horizontally.

Whatever the form of the fabric portion and rigging previously employed in a gliding parachute, there has been a tendency for the shape of the inflated wing to depart from the desired conventional airfoil shape. For example, the leading edge of the wing frequently buckles or folds inwardly under the pressure of air exerted on it as the parachute travels forwardly. Furthermore, the lower surface of the wing has not remained flat. Gliding parachutes have been made with multiple cells for channeling the flow of air in a generally horizontal direction through the parachute to sustain the desired airfoil shape. The various fabric and rigging constructions which have heretofore been utilized in gliding parachutes in an attempt to maintain the conventional airfoil shape have added to the weight and complexity of the parachute.

Prior gliding parachutes have had aspect ratios (span/chord) in the range of 1.5:1 to 1.25:1. It has been conventional in multi-cell gliding parachutes for the maximum camber height to chord ratio to be approximately 0.3:1. The length of the suspension lines has been such that the vertical distance between the top of the head of a jumper and the lower surface of the fabric panel directly above the jumper's head has been at least equal to, and in most cases substantially greater than, the span of the wing. Stating it another way, the maximum ratio of the span to the vertical distance between the lower panel surface and the point of connection of the risers to the harness has been about 1:1 with the parachute inflated. Prior art gliding parachutes have had a suspension point located a distance of 10–15% of the chord length aft of the leading edge.

Pilot chutes have been utilized to facilitate deployment of prior gliding parachutes. Typically, the lines from the pilot chute have been directly connected to the upper canopy fabric, necessitating the extensive utilization of reinforcing strips at the point of attachment of the upper canopy. Furthermore, when a pilot chute has been utilized to facilitate deploymnet of the gliding parachute wing, the pilot chute has thereafter trailed behind the inflated wing as it has glided forwardly at an air speed of 25–30 miles per hour. The pilot chute has thus been a source of significant drag, which has substantially reduced the glide ration of the gliding parachute.

U.S. Pat. No. 3,228,635 of Hughes, et al discloses an early gliding parachute in which a single flexible panel has a plurality of suspension lines connected thereto which are proportioned in length to cause the panel when inflated to assume an airfoil configuration.

U.S. Reissue Pat. No. Re. 26,427 to Jalbert discloses a gliding parachute including an upper canopy and a bottom planar skin connected together by a plurality of vertically extending, spaced apart ribs to define longitudinal channels through which air flows to sustain a conventional airfoil shape. The inflated parachute has a downwardly facing intake opening along its leading edge and a restricted outlet opening along its trailing edge. Connected to the bottom skin of the parachute are a plurality of fabric wedges which provide for even distribution of the forces of the suspension lines to the bottom skin to permit it to retain a flat configuration during flight.

U.S. Pat. No. 3,428,277 to Everett discloses a gliding parachute including a plurality of inflatable ram air scoops along the leading edge of the wing which serve to maintain the leading edge extended and prevent buckling or inward folding thereof. This arrangement supposedly permits the parachute to maintain a preferred angle of attack with respect to the direction of travel during descent so that a lift to drag ratio of approximately 3.7 or more can be achieved. A plurality of spaced apart, vertically aligned vanes are provided along the leading edge of the wing to help stabilize the parachute during flight and to aid in maintaining the desired shape and contour of the ram air scoops. This patent further contains a reference to other U.S. Patents disclosing gliding parachutes.

U.S. Pat. No. 3,524,613 of Reuter, et al discloses a multi-cell ram air type gliding parachute in which suspension lines have a uniform length in order to impart an arcuate contour to the wing when inflated. The arcuate shape is supposedly utilized to prevent buckling of the central portion of the parachute during flight. The vertical dividers between the upper and lower panels of the wing are provided with openings that permit lateral air flow to equalize air pressure within the adjacent channels.

U.S. Pat. No. 3,724,789 of Snyder discloses a gliding parachute of the multi-channel type in which the suspension lines are secured to the airfoil-shaped ribs between the upper and lower panels of the wing with a plurality of reinforcing tapes to distribute the load and maintain the airfoil shape of the inflated parachute.

In an article entitled "Jump With Me! The Parachute That Glides Like a Plane", by Douglas Garr, Popular Science 19, pages 76–77 and 112, there is described a gliding parachute of the multi-channel type in which a special pilot chute and reefing line system is utilized to soften deployment of the main gliding parachute. When the main wing is fully opened, the pilot chute and deployment bag rest on top of the upper canopy.

In an article entitled "A New Kind of Flying Machine", by Wayne Thoms, published in MECHANIX ILLUSTRATED, September, 1978, pages 36–37, there is disclosed a gliding parachute of the multi-channel type whose suspension lines support a man-carrying carriage including an engine powered propeller.

In an article entitled "Paracraft-The Powered Parafoil", by Luther Hux, published in MODEL AVIATION magazine, September, 1980, pages 62–65 and 122, there is disclosed a gliding parachute of the multi-channel type whose suspension lines support a radio-controlled model airplane fuselage having an engine driven propeller. The article indicates that the parachute has a 2:1 aspect ratio.

U.S. Pat. Nos. 2,214,569; 2,282,407; 2,577,047; and 2,610,008 as well as French Pat. No. 824,349 disclose various arrangements for deploying dome-shaped parachutes utilizing a pilot chute. U.S. Pat. Nos. 2,365,184; 2,358,582; and 3,199,814 disclose various seam and suspension line attachment constructions for parachutes. Finally, U.S. Pat. Nos. 1,562,258; 1,872,705; 2,511,263; 2,520,931; 2,527,553; 2,693,924; 2,696,959; 2,721,716; and 3,173,636 and British Pat. No. 1,102,665 disclose further designs for dome-shaped parachutes.

SUMMARY OF THE INVENTION

It is therefore the primary object of the present invention to provide a gliding parachute having an improved construction which results in superior maneuverability and glide ratio.

It is a further object of the present invention to provide a gliding parachute with a pilot chute connected thereto for facilitating deployment of the main wing of the gliding parachute and which pilot chute thereafter automatically collapses to eliminate the drag thereof so that the glide ratio of the wing will be maximized.

It is still a further object of the present invention to provide a gliding parachute having an airfoil configuration when inflated which maximizes lift and maneuverability.

The present invention provides a gliding parachute of the flexible, multi-cell airfoil type having a length to width ratio in the range of approximately 2:1 to 2.85:1, a maximum camber height to chord ratio in the range of approximately 0.1:1 to 0.2:1, a wing span to load attachment distance ratio of approximately 2:1, and an attachment point approximately 25% to 45% of the chord aft of the leading edge. The suspension lines and the fabric sections of the wing are dimensioned to impart a side to side curvature to the inflated wing. The gliding parachute has superior maneuverability and lift. A special pilot chute and bridle assembly are provided so that upon deployment of the main chute the pilot chute will automatically collapse to substantially reduce its drag, thereby improving the glide ratio of the main parachute.

BRIEF DESCRIPTION OF THE DRAWINGS

FIG. 11 illustrates the deployment sequence of the gliding parachute of FIG. 1.

FIG. 12 is a side elevational view of the gliding parachute of FIG. 1 in flight showing its special pilot chute which has automatically collapsed at the conclusion of the deployment sequence to reduce its drag, thereby improving the glide ratio of the main parachute.

FIG. 13 is an enlarged view of the inflated pilot chute and bridle assembly with portions broken away, and showing the collapsed configuration of the pilot chute in phantom lines.

FIG. 14 is a sectional view of the pilot chute bridle taken along line 14—14 of FIG. 13.

Throughout the figures like reference numerals and letters refer to like parts unless otherwise indicated.

DESCRIPTION OF THE PREFERRED EMBODIMENTS

Figure 1:
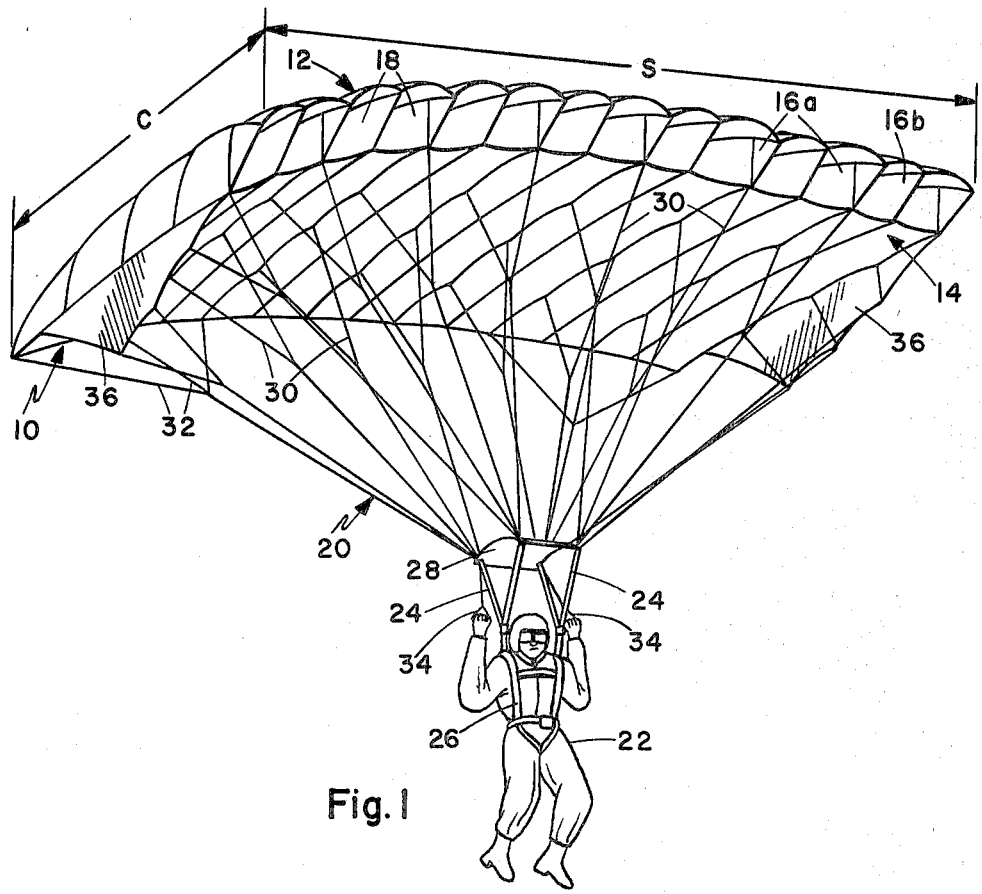
FIG. 1 is a perspective view of a first embodiment of the gliding parachute of the present invention in flight showing a jumper suspended therefrom.

Referring to FIG. 1, there is illustrated therein a perspective view of a first embodiment of the gliding parachute 10 of the present invention. The parachute includes aligned upper and lower panels 12 and 14, each having a generally rectangular configuration. As used herein the term span shall refer to the distance S in FIG. 1. This is the distance between the side edges of the parachute when it is inflated. As used herein, the term chord shall refer to the distance C in FIG. 2. This is the distance between the leading and trailing edges of the parachute 10 when inflated. Preferably, the length to width ratio of the upper and lower panels 12 and 14 is such that the inflated parachute has an aspect ratio (span/chord) in the range of approximately 2:1 to approximately 2.85:1.

Continuing with FIG. 1, the upper and lower panels 12 and 14 are connected to one another by a plurality of vertically extending airfoil-shaped fabric ribs 16. The ribs extend transversely across the panels at longitudinally spaced locations to define a plurality of cells 18. The upper panel 12 is connected to the upper edge of each of the ribs 16. Similarly, the lower panel 14 is connected to the lower edge of each of the ribs 16. Upon inflation, the fabric wing constructed from the panel and the ribs assumes the multi-cell configuration illustrated in FIG. 1. The ribs may have holes therethrough to allow pressure equilization within the cells. The forward longitudinal edges of the upper and lower panels 12 and 14 are vertically spaced apart to form the leading edge of the wing. As the wing glides forwardly, air flows rearwardly through each of the cells 18 to sustain the airfoil cross section of the parachute.

The fabric portions of the parachute may be made of any high strength, lightweight fabric of suitable porosity. For example, the fabric portions may be made of fabric sold under the trademark F-111 RIPSTOP NYLON having a 0.3 porosity. This fabric utilizes a high tenacity yarn with heat and light inhibitors. The fabric sections may be connected by stitching their adjoining edges with strong thread made of a material such as that sold under the trademark NYLON.

A plurality of suspension lines 20 (FIG. 1) are connected to the fabric wing and extend downwardly in converging relationship to support a load which in the illustrated embodiment comprises a jumper 22. As is conventional, the lower portions of the suspension lines include four risers 24. The rope portions of the suspension lines are attached to the upper ends of the four risers 24 by connector links (not shown in FIG. 1). The lower ends of the risers are in turn secured to a harness 26 worn by the jumper 22. Four separate groups of the suspension lines are threaded through corresponding corners of a conventional square slider 28. During deployment of the parachute, the slider 28 moves downwardly over the suspension lines until it reaches the position shown in FIG. 1 directly above the head of the jumper 22. The slider thus controls inflation of the parachute and prevents explosive openings thereof.

The upper portions of the suspension lines include pairs of cascade lines 30 whose upper ends are connected to the ribs 16 through the lower panel 14 as hereafter described in greater detail. A plurality of control lines 32 may be manually operated by the jumper 22 by pulling on toggles 34 to deform the trailing edges of the parachute to permit steering and modification of the angle of attack of the parachute.

The various lines may be made of any suitable, lightweight, high strength material. For example, 450-700 pound test line made of material sold under the trademarks DACRON or KEVLAR may be utilized.

As shown in FIG. 1, the upper ends of the cascade lines 30 which form part of the suspension lines are connected to the ribs 16 to define a plurality of longitudinally spaced and transversely extending rows. The suspension lines are proportioned in length so that during flight they impart a longitudinal arcuate curvature to the wing portion of the parachute. The suspension lines are further proportioned in length so that the ratio of the span S of the wing to the vertical distance H (FIG. 2) between the lower panel 14 and the lower ends of the risers 24 is approximately 2:1. By way of example the span S may equal approximately 21 feet and the vertical distance H may equal 11½ feet. Thus, the parachute of the present invention utilizes suspension lines which are substantially shorter than those of prior gliding parachutes. This saves weight, makes packing easier, and simplifies deployment. Furthermore, the center of gravity is much closer to the wing than in prior gliding parachutes. This facilitates steering and changes in the angle of attack of the wing.

Figure 2:
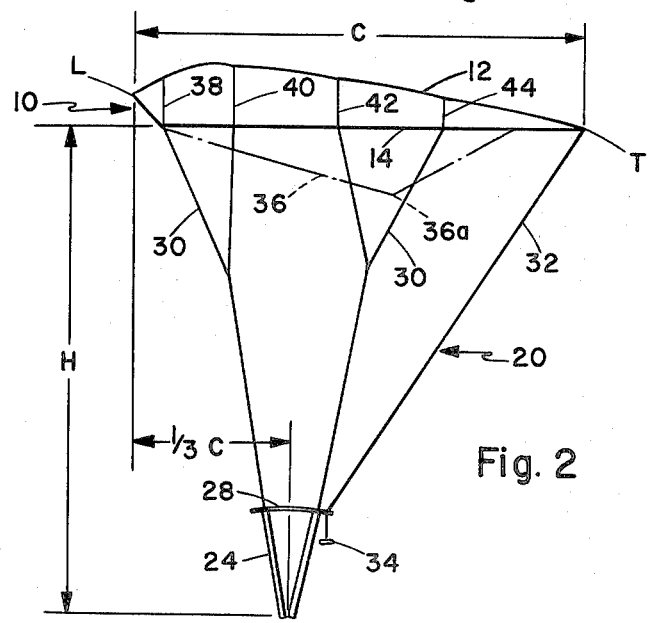
FIG. 2 is a side elevational view of the gliding parachute of FIG. 1.

As shown in FIG. 2, the suspension lines 20 are further proportioned in length so that the load attachment point (the lower ends of the risers 24) is approximately 25%–45%, and preferably 33% of the chord distance aft of the leading edge of the wing during flight. For the wing configuration herein described, positioning the load attachment pilot relative to the leading edge of the wing in this distance range results in the preferred angle of attack which maximizes maneuverability and glide ratio.

A pair of generally triangular fabric stabilizers 36 (FIGS. 1 and 2) each have their base edges secured to corresponding ones of the side edges of the lower panel 14. The upper portions of the outer cascade lines 30 are attached to the stabilizers to maintain them in their downwardly and inwardly directed positions during flight. As shown in FIG. 2, preferably the apex 36a of each of the triangular stabilizers is positioned at least 50% of the chord distance C aft of the leading edge L of the wing. During flight, the stabilizers 36 act as vertical stabilizers. They also act as boost tips and prevent air from spilling out laterally from underneath the curved wing. This improves the lift of the gliding parachute.

Figure 3:
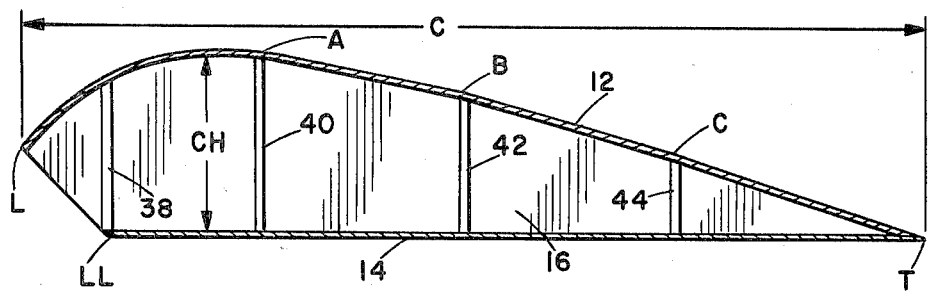
FIG. 3 is an enlarged, side elevational view of one of the ribs of the parachute of FIG. 1.

As best seen in FIG. 1, the upper panel 12 of the wing is connected along the entire upper edge of each of the ribs 16. Similarly, the lower panel 14 is connected along the entire lower edge of each of the ribs 16. The ribs 16 have a special airfoil shape in order to maximize the lift developed by the wing during forward gliding. FIG. 3 illustrates the shape of a preferred embodiment of the ribs 16. The shape of the upper edge of the rib includes a convexly curved forward portion L-A, a first straight segment A-B, a second straight segment B-C and a third straight segment C-T. The first, second and third segments taper downwardly to the trailing edge T of the wing which is comprised of the adjoined rearward longitudinal edges of the upper and lower panels 12 and 14. The second segment B-C extends at an angle of approximately three degrees downwardly from the first segment. Likewise, the third segment C-T also extends at an angle of approximately three degrees downwardly from the second segment. Preferably, the ratio of the maximum camber height CH (FIG. 3) to the chord C is in the range of approximately 0.1:1 to approximately 0.2:1. The resultant airfoil of the inflated wing has been found to provide superior lift.

The chord C (FIGS. 1 and 3) may be, for example, approximately eleven feet six inches, this being the transverse dimension of the wing. The lower edge of the rib 16 illustrated in FIG. 3 is preferably straight between the points LL and T. The forward edge L-LL of the rib 16 preferably extends at an angle of 45 degrees with respect to the forwardmost suspension line connection 38. Preferably, each rib 16 has three other suspension lines connections 40, 42 and 44 secured thereto at positions illustrated in FIG. 3.

Figure 4:
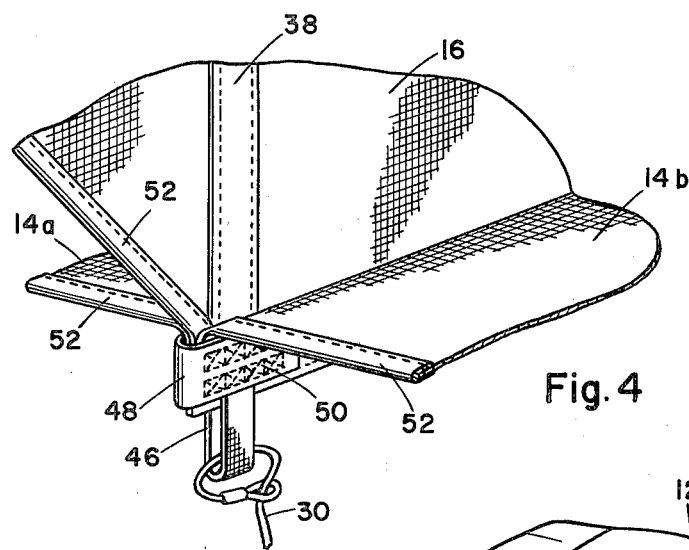
FIG. 4 is an enlarged perspective view of a portion of the gliding parachute of FIG. 1 illustrating details of its leading edge construction.
Figure 5:
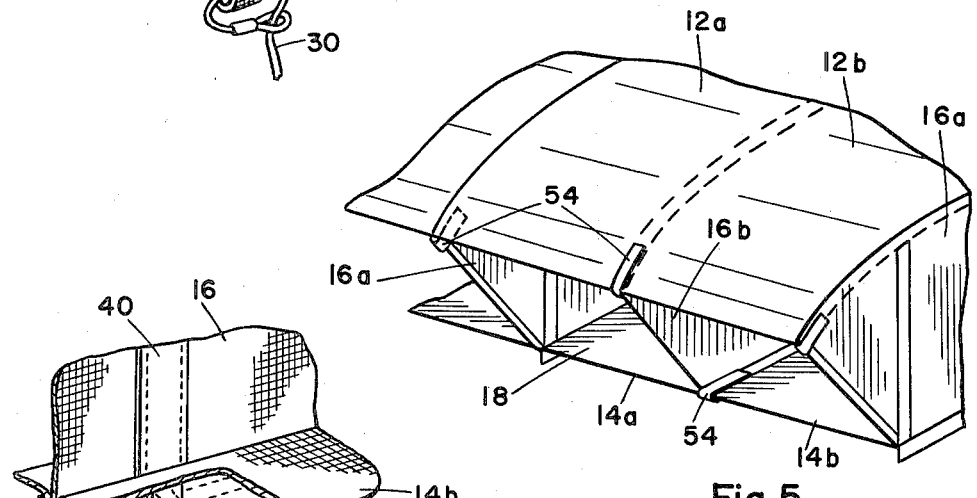
FIG. 5 is another enlarged perspective view of a portion of the leading edge of the gliding parachute of FIG. 1 illustrating the shape of the intakes to its multiple cells.

FIG. 4 illustrates the manner in which the lower panel 14 is joined to the lower edge of the forward portion of the rib 16. Also illustrated in FIG. 4 is the manner in which one of the cascade lines 30, which forms a portion of one of the suspension lines, is connected to a fabric loop 46. The lower panel 14 is comprised of a plurality of transversely extending, generally rectangular sections such as 14a and 14b whose adjacent side edges are sewn in overlapping relationship with the lower edge of a corresponding rib 16 as shown in FIG. 4. A seam and reinforcement strip 48 extends around the upper end of the loop 46 and is sewn to the sections 14a and 14b and the rib 16 with a box X stitch 50. The upper end of the loop 46 is sewn in overlapping relationship with the lower end of the suspension line connection 38 which in the illustrated embodiment comprises a reinforcing tape 38 stitched to the rib 16 and extending perpendicular to its lower edge. Preferably, the leading edges of the panel sections 14a and 14b and the inclined edge of the rib 16 have sewn thereto seam end reinforcements 52. The reinforcing tape 38, the loop 46, the reinforcing strip 48, and the seam end reinforcements 52 may all be made of a relatively thick, high strength synthetic woven material such as that sold under the trademark NYLON. As shown in FIG. 5, additional reinforcements 54 are provided at various ones of the leading edge seams.

The previously described leading edge construction of the parachute 10 insures that the curvature of the forward portion of the airfoil is maintained in flight as shown in FIG. 2. The construction of the wing prevents the forward periphery of the upper panel 12 from tucking back and destroying the optimum airfoil shape.

Figure 6:
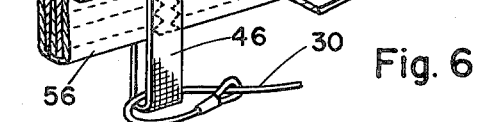
FIG. 6 is an enlarged, fragmentary perspective view illustrating the connection of one of the cascade lines of the gliding parachute of FIG. 1 aft of its leading edge.

FIG. 6 illustrates the manner in which the cascade line 30 aft of the leading edge is connected to a single vertically extending reinforcing tape 40 sewn to the rib. Also visible in FIG. 6 is the reinforcment fabric 56 which is sewn around the entire lower edge of the rib 16.

Figure 7:
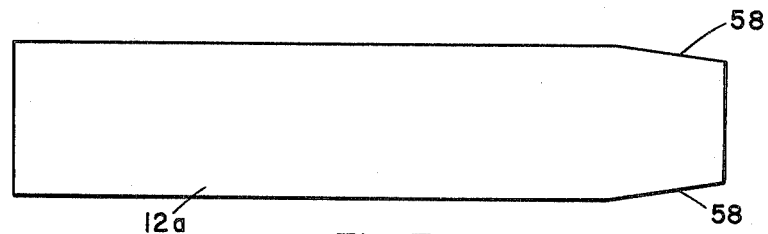
FIG. 7 is an enlarged top plan view of one of the upper panel sections of the gliding parachute of FIG. 1.

As previously indicated, the inflatable wing of the parachute has a longitudinal arcuate curvature which is illustrated in FIG. 1. In other words, the wing is curved from one side edge to the other side edge thereof. This curvature is obtained by proportioning the length of the suspension lines and by dimensioning the various fabric pieces in a particular manner. As shown in FIG. 5, the upper panel 12 is comprised of a plurality of generally rectangular, transversely extending sections such as 12a and 12b whose adjacent side edges are sewn to one another and to the upper edge of a corresponding one of the ribs 16. As shown in FIG. 7, each of the sections, such as 12a, of the upper panel has inwardly tapering rearward side edges 58. The side edges of adjacent ones of the upper panel sections are sewn together. During flight, the trailing edge portion of the wing is curved downwardly by the control lines 32. The tapering side edges 58 of the upper panel sections serve to maintain the smooth contour of the wing.

Referring again to FIG. 5, each upper panel section such as 12a which defines the upper wall of one of the cells 18 has a greater longitudinal dimension (from side edge to side edge) than the lower panel section 14a defining the lower wall of the same cell. Furthermore, as shown in FIG. 1, the ribs 16 include side ribs 16a and center ribs 16b between each adjacent pair of side ribs. Referring again to FIG. 5, each center rib 16b has a greater camber height than that of the side ribs. The foregoing dimensioning of the upper and lower panel sections and the side and center ribs serves to facilitate and enhance the longitudinal arcuate curvature of the wing. It also eliminates any puffing, creasing or wrinkling that would otherwise occur if the panel sections and ribs all had identical dimensions.

The gliding parachute of the present invention utilizes no "standing" seams on the upper panel 12 and instead utilizes a seam construction that is far less bulky.

Figure 8:
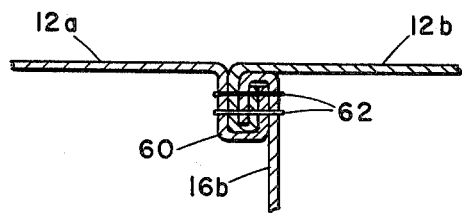
FIG. 8 is an enlarged vertical sectional view through a portion of the gliding parachute of FIG. 1 illustrating the manner in which adjacent upper panel sections are stitched to each other and to the upper edge of one of the ribs.

Referring to FIG. 8, the upper panel section such as 12a and 12b have their adjacent transversely extending edges overlapped and folded into a generally U-shaped configuration 60. The upper edge of a corresponding rib such as 16b is folded over and inserted into the cavity of the U-shaped configuration 60 formed from the adjacent edges of the panel sections 12a and 12b. Stitching 62 secures the overlapping panel section edges and the inserted rib edge together. The stitching 62 extends around the leading and trailing edges of the panel sections and rib and transversely along the edge of the panel section 12a and the edge of the rib 16b. The resultant seam is strong enough to endure the stresses encountered during flight, yet utilizes no thick reinforcing material which would add to the bulk and weight of the parachute.

Figure 9:
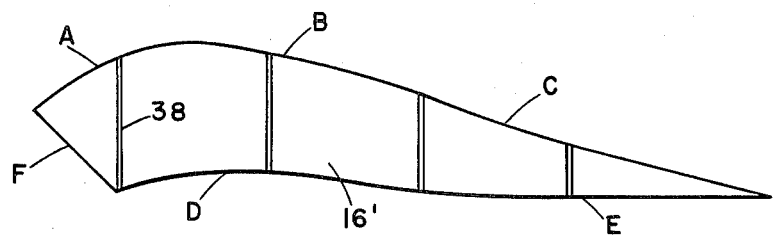
FIG. 9 illustrates an alternate configuration for the ribs of the gliding parachute of FIG. 1.

FIG. 9 illustrates an alternate embodiment 16' for the rib of the parachute of the present invention. The shape of the upper edge of the rib 16' includes convexly curved forward portion A, convexly curved intermediate portion B which tapers downwardly toward the trailing edge of the wing, and a concavely curved rearward portion C which tapers downwardly to the trailing edge of the wing. The shape of the lower edge of the rib 16' includes a concavely curved forward portion D and a convexly curved rearward portion E. The edge F which extends between the forward ends of the upper and lower edges of the ribs 16' extends at a 45 degree angle with respect to the reinforcing tape 38 for the forwardmost suspension line connected to the rib. As before, the upper panel 12 is connected to the upper edge of each of the ribs 16' along the entire length thereof. Similarly, the lower panel 14 is connected to the lower edge of each of the ribs 16' along the entire length thereof. During flight, the resultant undercambered airfoil with a reflex trailing edge will produce superior lift, and accordingly a high glide ratio.

The present invention further includes a pilot chute and specially designed means for connecting the pilot chute to the inflatable wing portion of the parachute. The pilot chute will pull the wing and the suspension lines from compact cargo configurations. Thereafter, upon deployment of the inflatable wing, the pilot chute will automatically collapse to substantially reduce the drag resulting therefrom. This substantially increases the glide ratio of the parachute.

Figure 10:
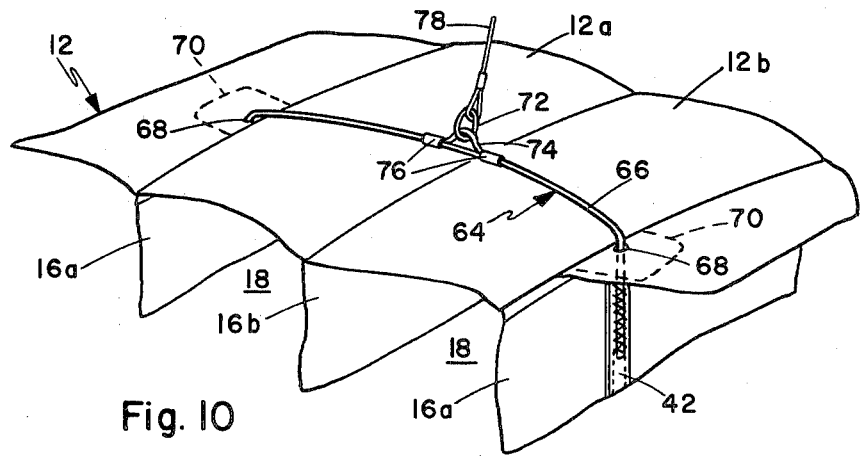
FIG. 10 is an enlarged perspective view of a portion of the top of the gliding parachute of FIG. 1 showing a portion of the bridle assembly for attaching the pilot chute.

Referring to FIG. 10, the gliding parachute includes a bridle attachment assembly 64 located in the middle of the upper panel 12 for connecting a pilot chute to the main wing. The assembly 64 is designed to permit the pulling or load forces exerted by the pilot chute during the deployment sequence to be directly transferred to the suspension lines 20 (FIG. 1). This eliminates the necessity of extensive reinforcing which would otherwise be required if the pilot chute bridle were attached only to the upper panel 12 as has been done in the past.

The bridle attachment assembly 64 (FIG. 10) includes a line 66 which extends across a pair of upper panel sections 12a and 12b. The ends of the line 66 extend through holes 68 and are secured in overlapping relationship with corresponding connecting tapes 42 attached to a pair of the ribs 16a. Preferably, the ends of the line 66 are securely affixed to the tapes 42 by heavy stitching as shown in FIG. 10.

A pair of reinforcing panels 70 (shown in phantom lines in FIG. 10) are stitched to the upper panel sections around the holes 68. A connecting ring 72 has a smaller line 74 extending therethrough. The opposite ends of the line 74 are securely connected to the middle of the line 66 by a pair of sleeves 76. A central bridle line 78, which is hereafter described in greater detail, is connected to the ring 72. The line 66 of the bridle attachment assembly extends across a pair of cells 18.

As indicated in FIG. 2, a pair of cascade lines 30 are secured at their upper ends to the reinforcing tapes 42. The ends of the lines 66 are sewn to these same tapes 42. The pulling forces of the pilot chute connected to the other end of the bridle line 78 are transferred directly to the suspension lines 20 during the deployment sequence. Thus, any likelihood that the fabric portions of the main wing will weaken or tear after many jumps is eliminated.

Referring to FIG. 13, the pilot chute 80 includes a hemispherical portion 82 made of a fabric of suitable porosity. The portion 82 is connected to a bridle assembly 84. The bridle assembly includes an outer bridle 86 (FIGS. 13 and 14) through which the central bridle line 78 extends. The outer bridle 86 may be formed by sewing together the side edges of two synthetic fabric tapes 88 as shown in FIG. 14.

The lower end of the outer bridle 86 is connected to the bottom of a conventional deployment bag 90 (FIG. 11). The upper end of the outer bridle 86 is connected to the lower ends of four pilot chute suspension tapes 92 (FIG. 13). The upper ends of the pilot chute suspension tapes are secured at ninety degree spaced locations about the lower periphery of the hemispherical portion 82 of the pilot chute. Preferably, the pilot chute suspension tapes also extend over the fabric of the hemispherical portion 82 and are connected together at their upper ends at the top center of the pilot chute.

The upper end of the central bridle line 78 extends through a metal reinforcing ring 94 securely attached in a hole which extends through the upper ends of each of the tapes 92. A plastic handle 96 is secured to the upper end of the central bridle line 78. Preferably, a layer of synthetic mesh or screen fabric (not visible on the drawings) extends between the pilot chute suspension tapes 92 beneath the pilot chute. This prevents the bridle assembly 84 or other objects from becoming tangled within the region defined between the diverging portions of the tapes 92 and the hemispherical portion 82.

Inward pulling of the central bridle line 78 (FIG. 13) relative to the outer bridle 86 will move the plastic handle 96 from its position shown in solid lines to its position shown in phantom lines. This will cause the hemispherical portion 82 of the pilot chute to collapse into the configuration shown in phantom lines at the conclusion of the deployment sequence.

The deployment sequence of the gliding parachute of the present invention may now be described. Prior to the jump, the main wing of the gliding parachute 10 is folded and stowed within the deployment bag 90 (FIG. 11). The deployment bag 90 is a small generally rectangular fabric bag which has a conventional construction. The lower end of the outer bridle 86 (FIG. 13) is secured to the bottom of the bag which is closed. The bag has a flap-like top closure panel. The main fabric wing of the gliding parachute is folded in a precise manner well known in the art and is stowed within the deployment bag 90. The central bridle line 78 (FIGS. 10 and 13) extends through a hole in the bottom of the deployment bag adjacent the area where the lower end of the outer bridle 86 is connected.

The deployment bag 90 with the main parachute stowed therein is carried on the back of the jumper 22 in the conventional manner prior to the jump. The suspension lines 20 and the control lines 32 (FIG. 1) are neatly folded in the conventional manner and also carried on the back of the jumper beneath the deployment bag 90. Finally, the folded pilot chute 80 and the folded bridle assembly 84 (FIG. 13) are carried on the back of the jumper immediately above the deployment bag. As is conventional, the suspension lines, the deployment bag, and the pilot chute are stowed in a container attached to the harnass 26 (FIG. 1) and carried on the back of the jumper 22.

When the jumper leaps out of the airplane and completes his or her free fall, the jumper grasps the handle 96 and pulls the pilot chute out of the container on his or her back. The jumper immediately releases the handle 96. The pilot chute inflates as shown in solid lines in FIG. 13 and pulls the bridle assembly 84 out of the container. When the bridle assembly 84 is fully extended, it pulls the deployment bag out of the container. This in turn causes the suspension lines 20 to be pulled out of the container. When the suspension lines 20 are fully extended, the pilot chute 80 pulls the deployment bag away from the main parachute 10 which immediately inflates. As soon as the deployment bag 90 has pulled away from the main parachute 10 as shown in FIG. 11, the outer bridle 86 is taught and inflation of the main parachute 10 pulls the central bridle line 78 through the outer bridle 86. This causes the handle 96 to move from its position shown in solid lines in FIG. 13 to its position in phantom lines in FIG. 13. The pilot chute 80 collapses and assumes the configuration shown in phantom lines in FIG. 13 and in solid lines in FIG. 12 due to the air flowing rapidly past the same. The deployment bag 90 now rests on top of the inflated main parachute 10 as shown in FIG. 12 and the collapsed pilot chute 80 trails behind as the jumper and main parachute glide forwardly. Since the pilot chute is collapsed, its drag is greatly reduced and thus the glide ratio of the parachute is greatly improved.

Having described a preferred embodiment of my gliding parachute, it should be apparent to those skilled in the art that my invention may be modified in arrangement and detail. Therefore, the protection afforded my invention should be limited only in accordance with the scope of the following claims.

I claim:

1. A flexible and inflatable gliding wing comprising aligned upper and lower flexible panels each having a generally rectangular configuration and a length to width ratio in the range of approximately 2:1 to approximately 2.85:1, the panels being connected to one another by a plurality of vertically extending airfoil-shaped ribs extending transversely across the panels at longitudinally spaced locations to define a plurality of cells so that upon inflation of the wing one adjacent set of the longitudinal edges of the panels will be vertically spaced apart to form the leading edge of the wing to permit air to flow rearwardly through the cells, the portion of the upper panel defining the upper wall of each cell having a greater longitudinal dimension than the portion of the lower panel defining the lower wall of the cell, the ribs including side ribs and a center rib between each adjacent pair of side ribs, the center ribs having greater camber height than the side ribs, the ratio of the maximum camber height of the ribs to the chord thereof being in the range of approximately 0.1:1 to approximately 0.2:1, a pair of generally triangular flexible stabilizers each having its base edge secured to, and extending downwardly from one of the side edges of the lower panel, and each stabilizer having an apex positioned at least 50% of the chord aft of the leading edge of the wing, and a plurality of suspension lines connected to the wing and extending downward from the wing in converging relationship to at least one point of attachment for a load, the upper ends of the suspension lines being connected to the ribs to define a plurality of longitudinally spaced and transversely extending rows of suspension lines, the suspension lines being proportioned in length so that during flight the suspension lines impart a longitudinal arcuate curvature to the wing, the ratio of the span of the wing to the vertical distance between the attachment point and the lower panel is approximately 2:1, and the attachment point is in the range of approximately 25% to approximately 45% of the chord aft of the leading edge of the wing.

2. The invention of claim 1 wherein:
the upper panel is connected to the upper edge of each of the ribs; and
the shape of the upper edge of each of the ribs includes a convexly curved forward portion, and first, second and third straight segments tapering downwardly to the trailing edge of the wing, the first segment being connected to the curved portion, the second segment extending at an angle of approximately 3 degrees downwardly from the first segment, and the third segment extending at angle of approximately 3 degrees downwardly from the second segment.

3. The invention of claim 1 wherein:
the upper panel is connected to the upper edge of each of the ribs;
the shape of the upper edge of each of the ribs includes a convexly curved forward portion, a convexly curved intermediate portion tapering downwardly toward the trailing edge of the wing; and a concavely curved rearward portion tapering downwardly to the trailing edge of the wing; and the shape of the lower edge of each of the ribs includes a concavely curved forward portion and a convexly curved rearward portion.

4. In combination:
a flexible and inflatable gliding wing parachute having a large canopy and a plurality of load suspension lines which extend therefrom;
a pilot chute having a small canopy and a plurality of suspension tapes which extend therefrom; and
means for connecting the pilot chute to the gliding wing parachute including a bridle attachment line extending across the medial portion of the large canopy and secured at its opposite ends to corresponding ones of the suspension lines, a deployment bag for enclosing the large canopy, an outer bridle having an upper end connected to the suspension tapes and a lower end connected to the deployment bag, a handle located on top of the small canopy, and a central bridle line slidable within the outer bridle, the central bridle line having an upper end which extends through the center of the small canopy and is secured to the handle and a lower end which extends through the deployment bag and is connected to the bridle attachment line,
whereby during descent with the large canopy packed in the deployment bag, and the suspension lines, pilot chute and connecting means folded adjacent the deployment bag, pulling on the handle will cause the pilot chute to inflate, extend the outer bridle and central bridle line to cause the suspension lines to unfold, thereafter pull the deployment bag away from the large canopy, and thereafter permit the large canopy to inflate to pull the central bridle line downwardly through the outer bridle, thereby causing the handle to collapse the small canopy and substantially reduce the drag of the pilot chute.

* * * * *